United States Patent
Schäck et al.

(10) Patent No.: US 12,326,335 B2
(45) Date of Patent: Jun. 10, 2025

(54) PARAMETERIZATION AID FOR STRAIN GAGES

(71) Applicant: HOTTINGER BRÜEL & KJAER GMBH, Darmstadt (DE)

(72) Inventors: Marco M. Schäck, Rödemark (DE); Michael Dorfel, Griesheim (DE); Sandro Di Natale, Mannheim (DE); Dmitri Tcherniak, Humlebaek (DK); Gianmarco Sironi, Bensheim (DE); Jan-Michael Kleinschmidt, Darmstadt (DE)

(73) Assignee: Hottinger Brüel & Kjaer GmbH, Darmstadt (DE)

( * ) Notice: Subject to any disclaimer, the term of this patent is extended or adjusted under 35 U.S.C. 154(b) by 0 days.

(21) Appl. No.: 18/834,491

(22) PCT Filed: Jan. 31, 2023

(86) PCT No.: PCT/DE2023/000008
§ 371 (c)(1),
(2) Date: Jul. 30, 2024

(87) PCT Pub. No.: WO2023/147805
PCT Pub. Date: Aug. 10, 2023

(65) Prior Publication Data
US 2025/0109933 A1    Apr. 3, 2025

(30) Foreign Application Priority Data
Feb. 1, 2022 (DE) .................. 10 2022 000 384.8

(51) Int. Cl.
*G01B 7/16* (2006.01)

(52) U.S. Cl.
CPC ............ *G01B 7/18* (2013.01); *G01B 2210/00* (2013.01)

(58) Field of Classification Search
CPC .............................. G01B 2210/00; G01B 7/18
See application file for complete search history.

(56) References Cited

U.S. PATENT DOCUMENTS

| 6,621,268 B2 * | 9/2003 | Usaki ................ G08C 17/02 324/67 |
| 2001/0005138 A1 | 6/2001 | Usak |
| 2015/0198502 A1 | 7/2015 | Phares et al. |

FOREIGN PATENT DOCUMENTS

| CN | 108469326 A | * 8/2018 | ........... G01L 5/0042 |
| CN | 219624938 U | * 9/2023 | |
| JP | 2002310812 A | * 10/2002 | |
| JP | 2010-169429 | 8/2010 | |

OTHER PUBLICATIONS

International Search Report issued on May 16, 2023 by the European Patent Office in International Application PCT/DE2023/000008.

* cited by examiner

*Primary Examiner* — Octavia Hollington
(74) *Attorney, Agent, or Firm* — Henry M. Feiereisen LLC

(57) ABSTRACT

A parameterization aid for parameterizing applied strain gages includes a handle having a front end, a head piece arranged at the front end of the handle and including a contact surface formed with two fixing grooves for receiving two strain gage connection wires, a movable magnetic field barrier designed to avoid interference into further strain gage connection wires, and a transmitting device designed to transmit parameterization signals to the strain gage connection wires, which lie in the fixing grooves.

4 Claims, 7 Drawing Sheets

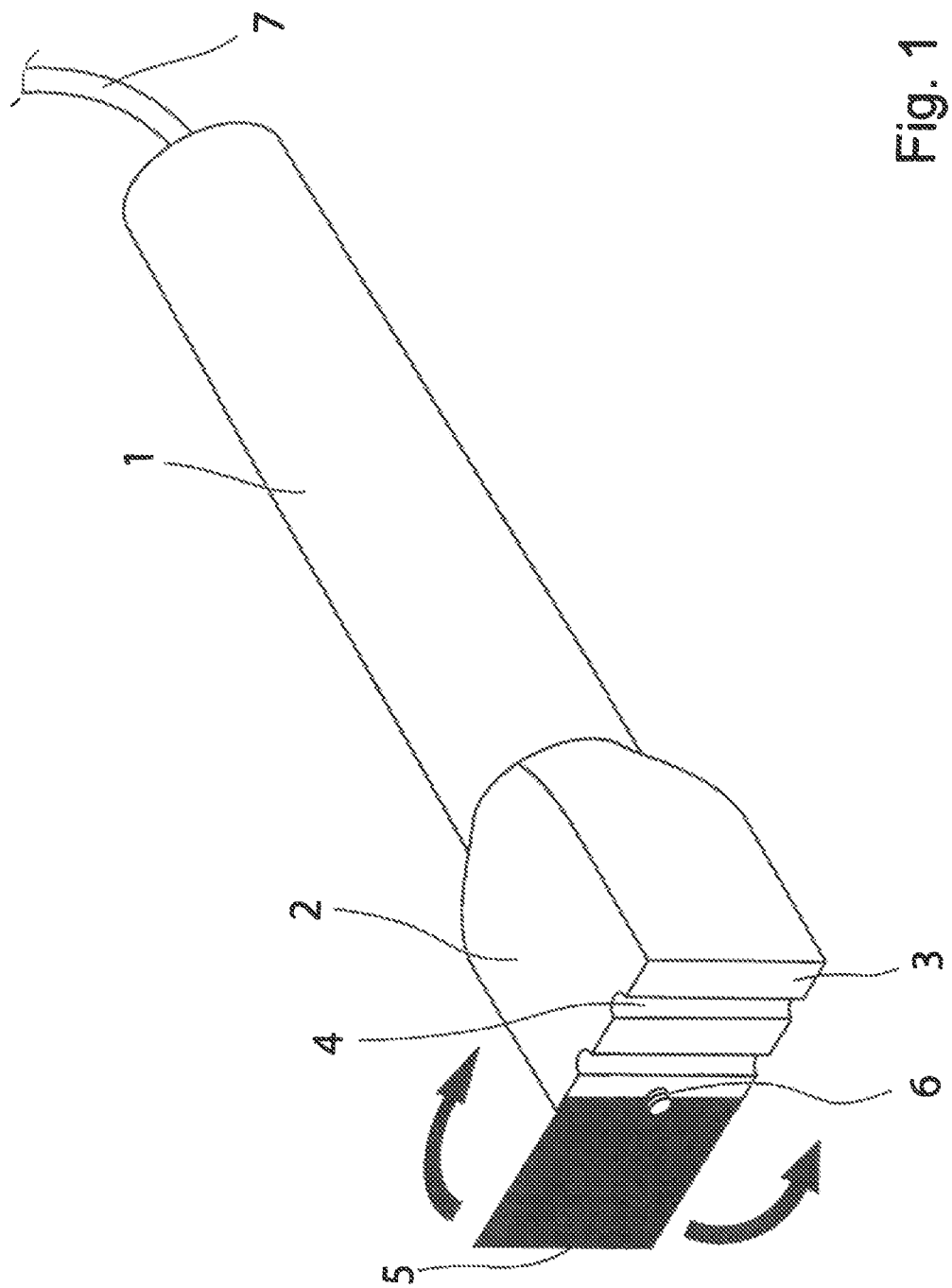

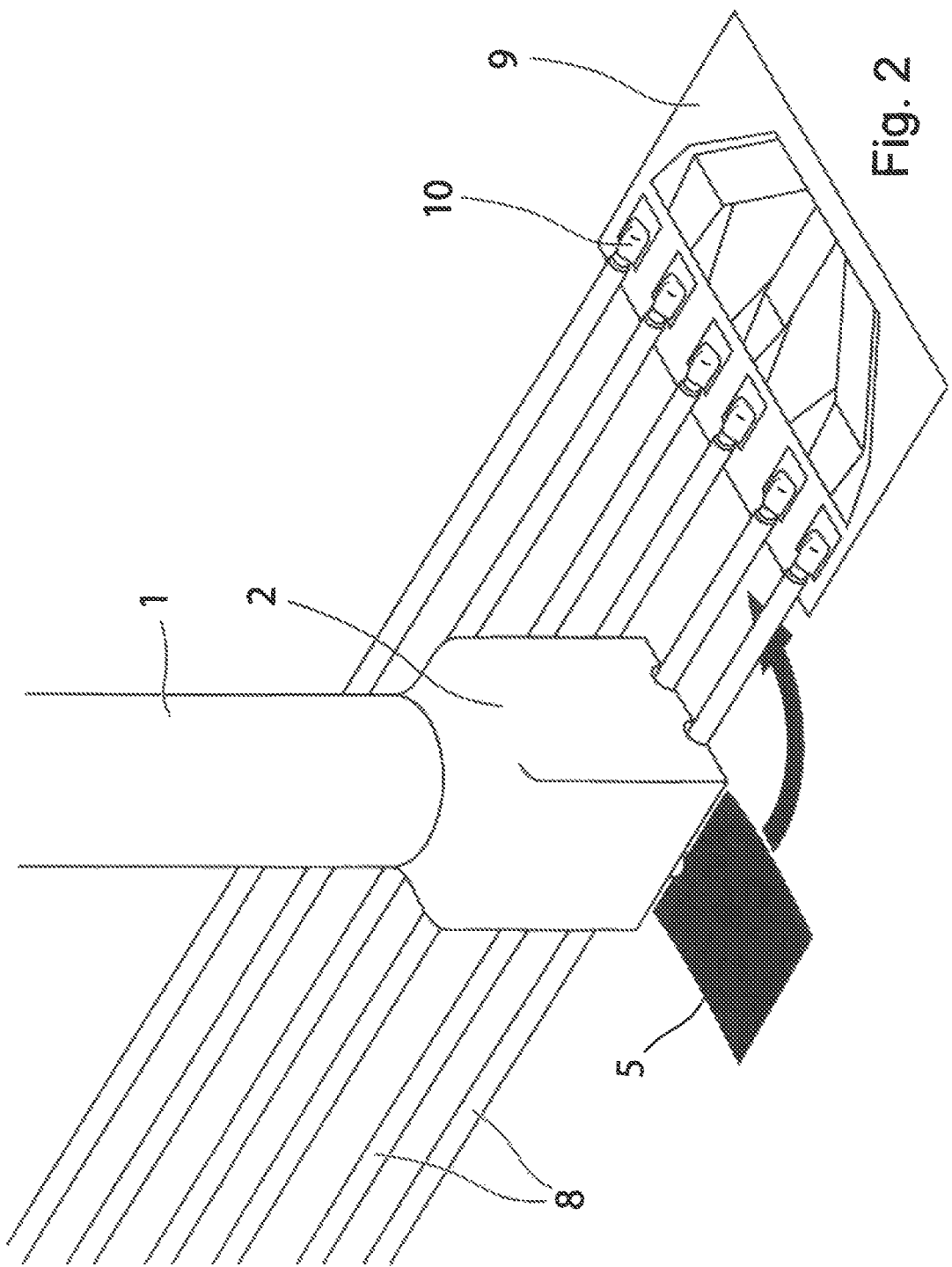

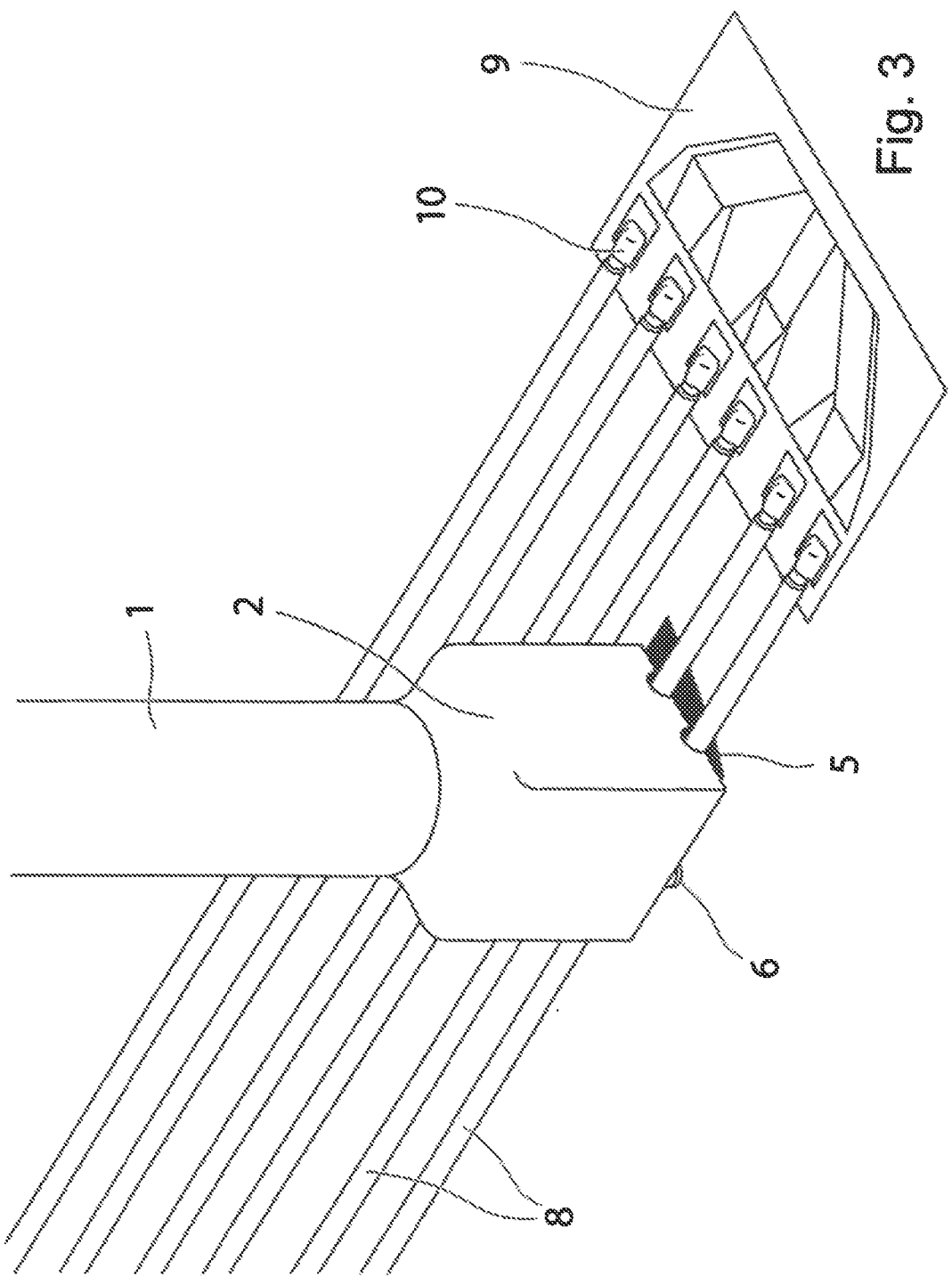

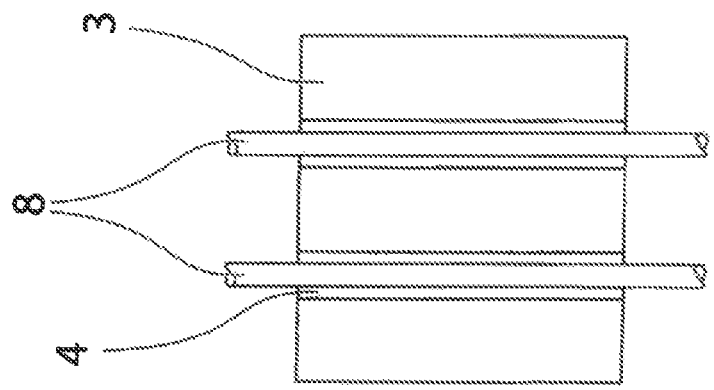
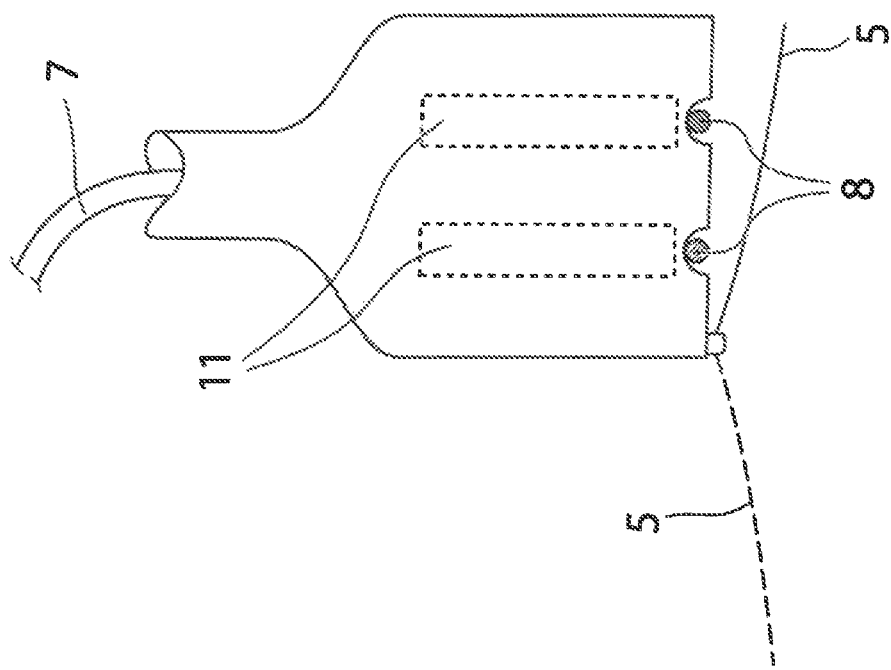

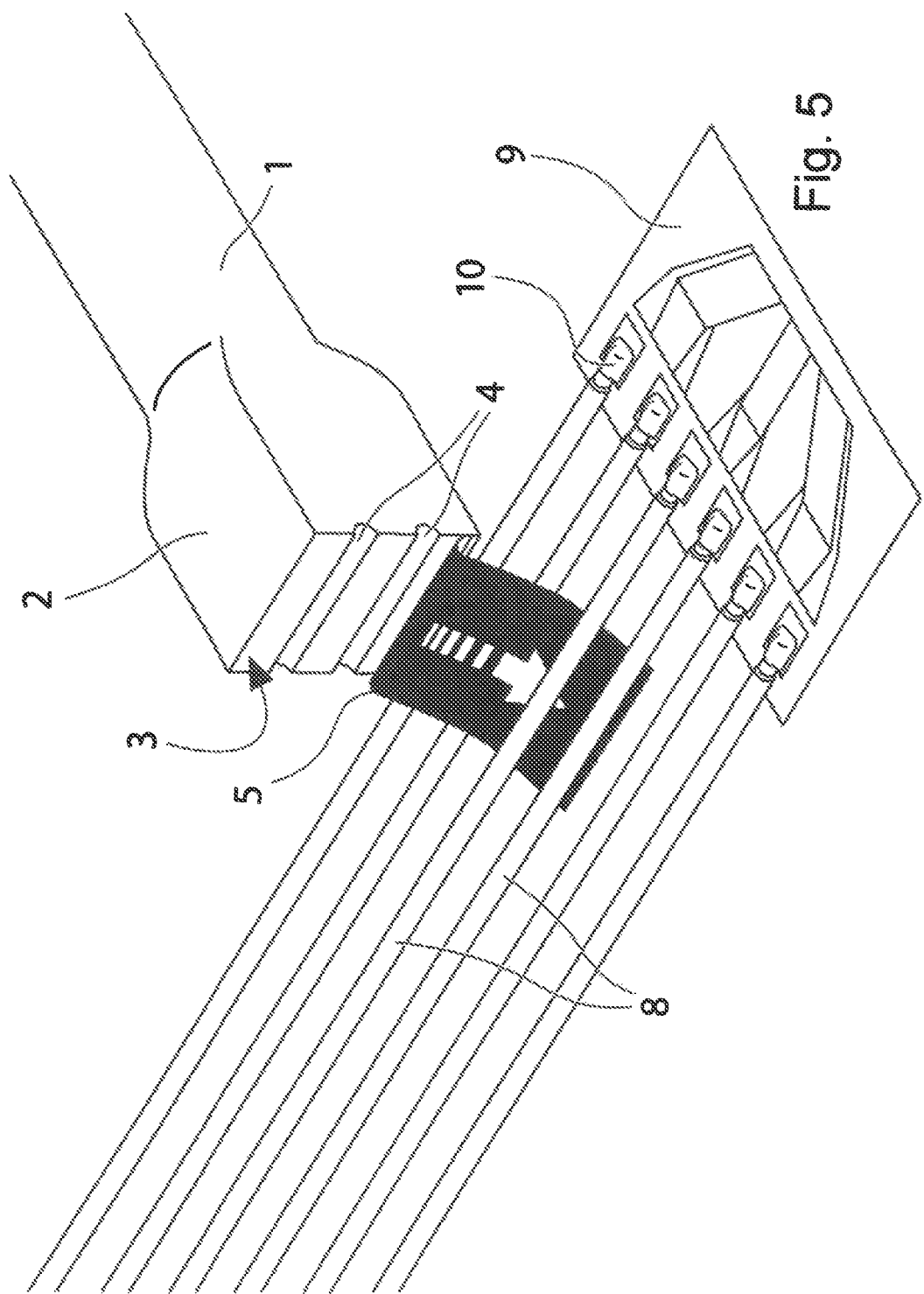

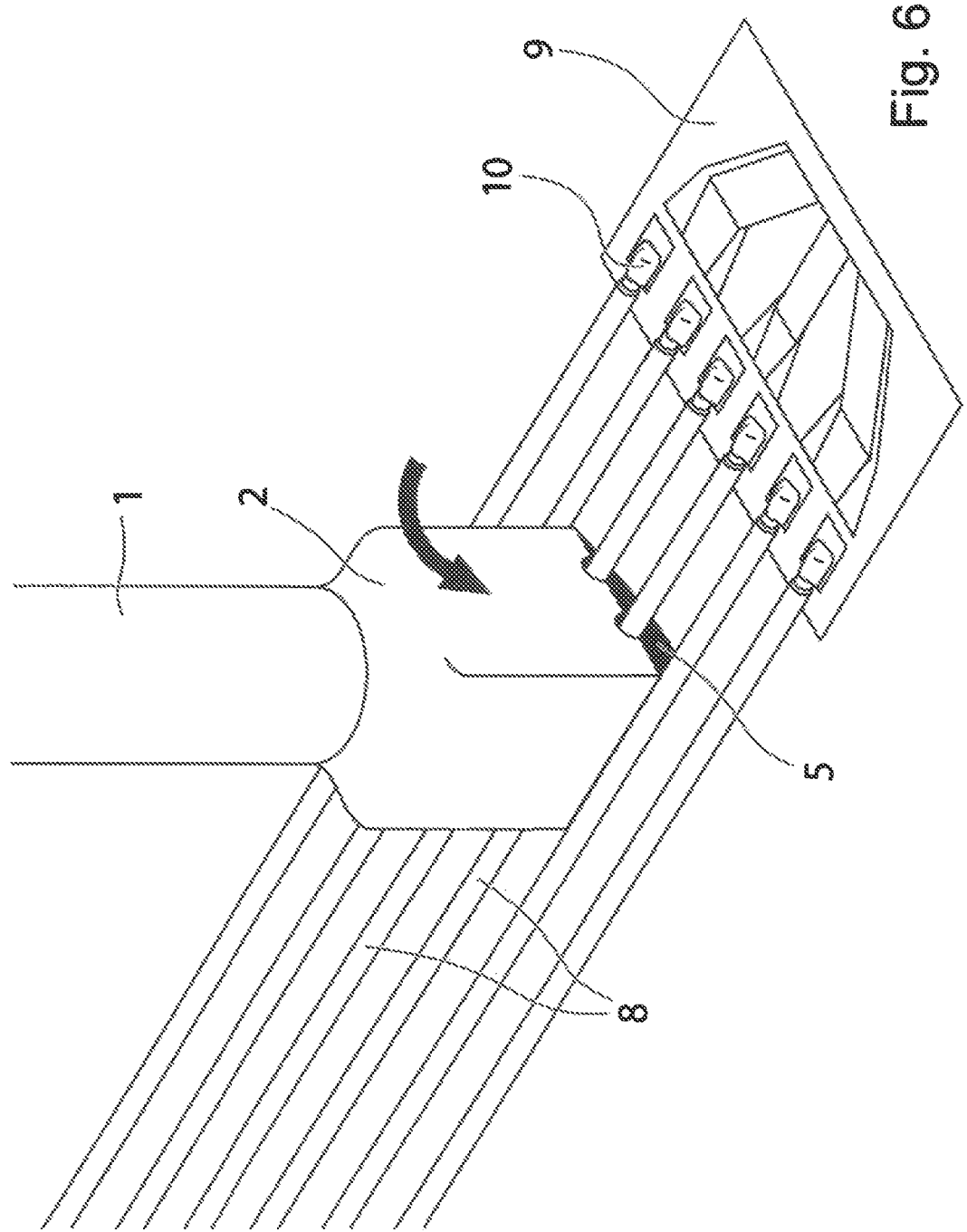

PARAMETERIZATION AID FOR STRAIN GAGES

CROSS-REFERENCES TO RELATED APPLICATIONS

This application is the U.S. National Stage of International Application No. PCT/de2023/000008, filed Jan. 31, 2023, which designated the United States and has been published as International Publication No. WO 2023/147805 A1 and which claims the priority of German Patent Application, Serial No. 10 2022 000 384.8, filed Feb. 1, 2022, pursuant to 35 U.S.C. 119 (a)-(d).

BACKGROUND OF THE INVENTION

The invention relates to a device for parameterizing applied strain gages and, in particular, to a device which is also suitable for parameterizing strain gages in which the soldering terminals are in close proximity to one another.

Airplanes, bridges, cranes and building structures are equipped with many sensors to ascertain complex loads. In the case of bridges, such loads are simulated with vehicles and in the case of airplanes, e.g., by means of hydraulic cylinders that deform the wings. The strain gages used here are bonded to the components on which a strain is to be measured. This bonding process involves several steps and is particularly time-consuming and complicated when the strain gage has to be attached, e.g., to a difficult-to-access location on a railroad bridge. After attachment, the strain gage is provided with a covering to protect it from moisture and mechanical contact. The strain gage has electrical soldering terminals to which short measuring cables have already been soldered on or are soldered on after application. The ends of these measuring cables are then connected to long measuring cables that lead to the measuring amplifier. Each measuring point must be connected to a separate measuring channel of a measuring device. When, e.g., a railroad bridge has several hundred or even over a thousand strain gage measuring points, the overall installation effort is extremely high. After installation, each measuring cable must be assigned to the correct measuring channel of the measuring amplifier. This can lead to errors, i.e. a measuring cable may be inadvertently connected to the wrong measuring channel.

Such measurements are normally carried out only once. There is therefore great interest in reducing the costs for the installation of the measuring points.

However, there are still further sources of error which are to be considered and avoided when installing the measuring system.

Each strain gage sensor has certain electrical properties that differ from sensor to sensor. These properties are called parameters. These different parameters must be set separately on each measuring channel of the measuring amplifier in order to achieve the greatest possible measuring accuracy. This problem has been known in metrology for many decades and has usually been solved. There are three basic solutions:

Solution a

The sensors have memory chips that contain the individual sensor parameters. These so-called Transducer Electronic Data Sheets (TEDS) contain all the necessary data that can be read out by the measuring amplifier. The TEDS are either integrated in the sensor cable or in the connector. TEDS are based on the IEEE 1451.4 standard, which is used worldwide. The advantage of a sensor fitted with a TEDS thus is that the sensor can be automatically recognized by a measuring amplifier, so that manual input of the various sensor parameters on the measuring amplifier is dispensed with.

Solution b

Attempts are being made to perfect the technology for manufacturing sensors such that all sensors have approximately the same parameters. However, this would result in high manufacturing technology costs.

Solution c

After production, the sensors are classified by various test steps and divided into groups so that each group contains sensors with approximately same parameters. However, this solution is not suitable for sensors with more than two parameters.

Solutions b and c therefore do not require to individually match the individual sensor to the measuring amplifier channel.

The combination of the sensor with TEDS has become established, particularly for precise measurements. However, there are also very specific measurement tasks in metrology for which no suitable solutions yet exist. There are sensors for which TEDS are not suitable for metrological and economic reasons—but are also oftentimes not necessary. This applies to strain gage sensors. Strain gages have a plurality of parameters that are documented on a paper data sheet. The user of strain gages reads the parameters from the data sheet and sets them manually on the measuring amplifier channel. Since in many cases there are less than 10 strain gage measuring points, manual input of the parameters has been common practice for decades. In addition, with such a small number of measuring cables, it is possible to connect each measuring cable to the correct amplifier channel without confusion.

The afore-described measurement situations with very many and widely dispersed sensor measuring points pose, however, completely new problems that could not be solved satisfactorily to date; in other words, the same installation procedures are still being used as are used for measurements with just a few measuring points. However, a meaningful measurement result can only be expected if all cables are actually connected correctly and all measurement channels are parameterized without errors. Even a single mixed-up cable or an inadvertently incorrectly read parameter from the data sheet or incorrectly set parameter can lead to an unusable overall measurement result. As the error rate increases exponentially with a high number of measuring points and the resulting many times higher number of parameters to be read and entered on the measuring amplifier, costs for such measuring tasks also increase exponentially when these errors are to be avoided by a 100% check.

An obvious solution for the skilled person is the use of TEDS. However, a strain gage is an inexpensive disposable sensor and it is uneconomical to combine a strain gage with an expensive TEDS, as the TEDS would also have to be removed when the strain gage is removed from the test object. Under these circumstances, recycling would be cost-intensive. For this reason, a different technology is used to parameterize strain gages. The parameterization aid has been invented to improve the implementation of this technology.

The following first describes how the novel parameterization of strain gages is to be carried out, then the structure of the parameterization aid provided for this purpose according to the invention and its handling are described.

The parameterization of a multiplicity of strain gages, which are arranged at widely dispersed measuring points, is carried out as follows: After the strain gages have been applied to the measurement object, the strain gage connection wires of the strain gage measurement points are electrically connected to the measurement cables of the measurement amplifier channels. A parameterization data packet is then preferably inductively fed into the strain gage connection wires of the strain gage, with the feed being carried out in such a way that only a single strain gage connection can receive the data packet. This means that only the two connection wires of one of the strain gages belonging to a strain gage rosette are addressed during the feed. The connection wires of the two other strain gages belonging to the same rosette or the connection wires of a strain gage arranged close to it are not addressed.

In practice, strain gages are often installed in places that are difficult to access.

It is therefore the object of the invention to provide an aid that facilitates the work and ensures that the correct strain gage is addressed.

SUMMARY OF THE INVENTION

In order to achieve this object, a parameterization aid has the following features: a handle, at the front end of which a head piece is arranged, wherein the head piece has a contact surface with two fixing grooves for receiving the two connection wires of a strain gage, a movable magnetic field barrier and a transmitting device for transmitting parameterization signals to the targeted two connection wires.

The advantage of this parameterization aid is that it can be easily guided by hand by the measurement technician and can also be placed at points on the measurement object that are difficult to reach. The magnetic field barrier is particularly useful in situations where there is a risk of the parameterization signals being scattered into other supply lines.

According to a refinement of the parameterization aid, the magnetic field barrier is removable. This is a helpful function when the connection wires lie in close proximity to one another and or when the strain gage is applied in a confined space.

According to a refinement of the parameterization aid, the contact surface, with the exception of the surface of the two fixing grooves, is provided with a soft-elastic plastic or rubber layer that is a maximum of 0.7 mm thick. The advantage of this plastic or rubber layer is that the touch-sensitive strain gages or the connection wires are not accidentally damaged when placing the device parameterization aid.

According to a refinement of the parameterization aid, the head piece is separable from the handle. As a result, the head is exchangeable, when, e.g., the magnetic field barrier has been damaged.

BRIEF DESCRIPTION OF THE DRAWING

The invention is described in more detail hereinafter with reference to schematic drawings:

FIG. 1 shows a perspective view of the parameterization aid.

FIG. 2 shows an operating state in which the parameterization aid is placed on two outer strain gage connection wires.

FIG. 3 shows the operating state depicted in FIG. 2, but the magnetic field barrier is pivoted into the closed position.

FIG. 4a shows the side view of the head piece with the transmitting device being assigned to the strain gage connection lines wires.

FIG. 4b shows the end face view of FIG. 4a, without magnetic field barrier.

FIG. 5 shows an operating state in which the parameterization aid is placed on two internal strain gage connection wires.

FIG. 6 shows the operating state of FIG. 5, in which the magnetic field barrier is in the closed position.

DETAILED DESCRIPTION OF PREFERRED EMBODIMENTS

LIST OF REFERENCE SIGNS

Figure 7A:
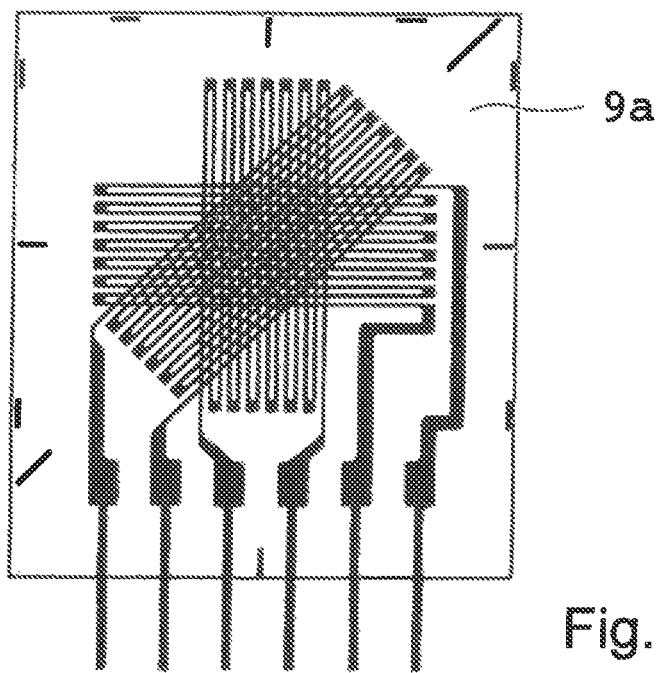
FIGS. 7a, b show strain gages according to the prior art.

1—handle
2—head piece
3—contact surface
4—fixing grooves
5—magnetic field barrier
6—pivot point
7—a connection cable
8—strain gage connection wires
9—strain gage carrier film
10—solder points
11—transmitting device FIG. 1 shows a perspective view of the parameterization aid. The handle 1 has at its upper end a connection cable 7, via which the parameterization signals are fed to the transmitting device 11. The head piece 2 shown on an enlarged scale has two semi-circular fixing grooves 4 into which the strain gage connection wires 8 are pressed. I.e., the distance between the two fixing grooves 4 is dimensioned such that the respective pair of strain gage connection wires 8 lies in the fixing grooves. A thin metal sheet of a material with high magnetic permeability, like, e.g., mu-metal, is formed as a magnetic field barrier 6. This magnetic field barrier 5 is movably attached to the head piece 2 at a pivot point 6 and is preferably pivotable.

FIG. 2 shows an operating state in which the parameterization aid is placed on two outer strain gage connection wires 8. In order to avoid magnetic interference into the 4 other strain gage connection wires 8, the magnetic field barrier 5 is guided under the two outer strain gage connection wires.

FIG. 3 shows the operating state depicted in FIG. 2, but now with the magnetic field barrier 5 pivoted into the closed position to prevent magnetic interference into the connection wires 8 of the other two strain gages.

FIG. 4a shows the side view of the head piece 2 with the schematically depicted transmitting device 11 for transmitting the parameterization signals. The . . . transmitting device 11 is a ferrite core with a current-carrying coil. The end portions of the legs of the ferrite core are therefore always directed exactly towards the two connection wires 8 of the respective strain gage. Moreover, the starting position and the closed position of the magnetic field barrier 5 are also illustrated. Depending on the embodiment of the ferrite core, there may also be three legs.

FIG. 4b shows the end face view of FIG. 4a, but without the magnetic field barrier 5.

FIG. 5 shows an operating state in which the parameterization device is placed on two inner strain gage connection wires 8. As the magnetic field barrier 5 is a thin, elastically deformable metal sheet, it can be pushed under the strain gage connection wires 8 even in confined spaces. In particularly tight conditions, the magnetic field barrier 5 may also be removed from the pivot point 6 and pushed separately by hand under the strain gage connection wires 8.

FIG. 6 shows an operating state from FIG. 5, in which the magnetic field barrier 5 is almost in the closed position.

Figure 7B:
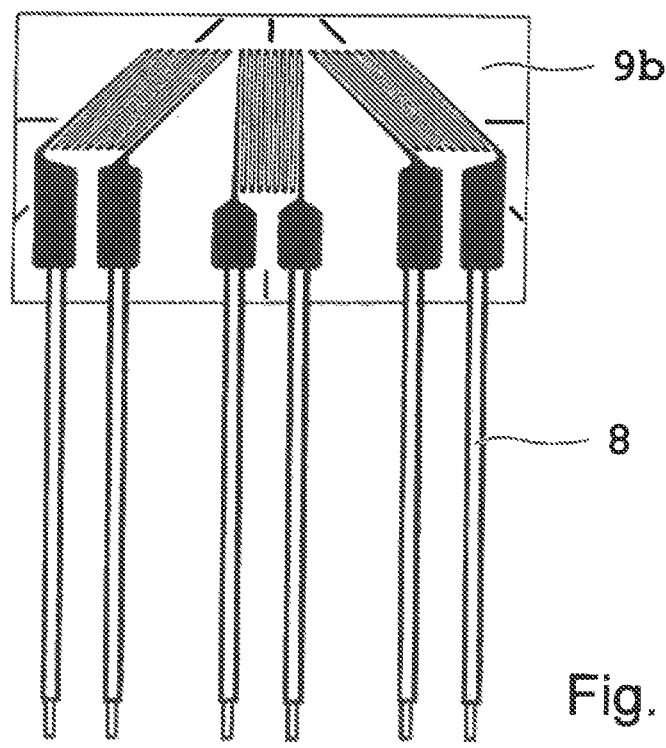

FIGS. 7a, 7b show strain gages from the prior art. The meandering strain gages of a very thin metal foil are bonded to a plastic carrier film 9. In particular, the strain gages lying above one another in FIG. 7a have the strain gage connection wires lying particularly close together, which can be parametrized safely and easily with the aid of the parameterization aid according to the invention.

In order to prevent damage to the strain gage connection wires 8, the soldering points 10 and in particular to the sensitive strain gages, the contact surface 3 of the head piece 2 can be designed to be soft and elastic, e.g. by means of a 0.5 mm thick rubber layer.

Furthermore, it is possible to make the head piece 2 separable from the handle 1. This is useful when different head pieces are to be used for special applications, e.g. applications are also conceivable in which the connection wires are further apart.

The invention claimed is:

1. A parameterization aid for parameterizing applied strain gages, the parameterization aid comprising:
 a handle having a front end;
 a head piece arranged at the front end of the handle and including a contact surface formed with two fixing grooves for receiving two strain gage connection wires;
 a movable magnetic field barrier designed to avoid interference into further strain gage connection wires; and
 a transmitting device designed to transmit parameterization signals to the strain gage connection wires, which lie in the fixing grooves.

2. The parameterization aid of claim 1, wherein the magnetic field barrier is removable.

3. The parameterization aid of claim 1, wherein the contact surface, with the exception of a surface of the two fixing grooves, is provided with a soft-elastic plastic or rubber layer which is at most 0.7 mm thick.

4. The parameterization aid of claim 1, wherein the head piece is separable from the handle.

* * * * *